United States Patent
Mukherji

(10) Patent No.: US 10,759,123 B2
(45) Date of Patent: Sep. 1, 2020

(54) COMPOSITES PRODUCT; A PULTRUSION CONTINUOUS METHOD FOR MANUFACTURING THEREOF

(71) Applicant: SP Advanced Engineering Materials Pvt. Ltd., Mumbai (IN)

(72) Inventor: Arindam Mukherji, Mumbai (IN)

(73) Assignee: SP ADVANCED ENGINEERING MATERIALS PVT. LTD., Mumbai (IN)

( * ) Notice: Subject to any disclaimer, the term of this patent is extended or adjusted under 35 U.S.C. 154(b) by 0 days.

(21) Appl. No.: 16/308,448

(22) PCT Filed: Jun. 14, 2017

(86) PCT No.: PCT/IN2017/050238
§ 371 (c)(1),
(2) Date: Dec. 7, 2018

(87) PCT Pub. No.: WO2017/216809
PCT Pub. Date: Dec. 21, 2017

(65) Prior Publication Data
US 2019/0270263 A1    Sep. 5, 2019

(30) Foreign Application Priority Data
Jun. 15, 2016  (IN) .............................. 201621020446

(51) Int. Cl.
*B29C 70/52*  (2006.01)
*B29C 70/08*  (2006.01)
(Continued)

(52) U.S. Cl.
CPC .......... *B29C 70/521* (2013.01); *B29C 70/081* (2013.01); *B29C 70/523* (2013.01);
(Continued)

(58) Field of Classification Search
CPC ............ B29C 70/52–528; B29C 70/70; B29C 70/081; B29D 99/0003; B32B 1/00;
(Continued)

(56) References Cited

U.S. PATENT DOCUMENTS

| 4,394,338 A | * | 7/1983 | Fuwa | B29C 70/521 264/135 |
| 4,752,513 A | * | 6/1988 | Rau | B29C 70/085 156/166 |

(Continued)

FOREIGN PATENT DOCUMENTS

GB    1373782    * 11/1974

*Primary Examiner* — Jeffrey M Wollschlager
(74) *Attorney, Agent, or Firm* — Ryan Alley IP

(57) ABSTRACT

The composite pultruded products either in "I" profile or "Plate" profile of higher cross sectional area where said products consisting essentially synthetic polyester felts as core impregnated with a resin system comprises of at least one resin, curing system comprising a curing agent and an accelerator, a filler, a thinner, pigment or any other additives; encapsulated between bi-directionally and/or uni-directionally oriented synthetic fabric selected from polyester, carbon, aramid, glass, basalt and mixtures thereof impregnated with said resin system are provided. In another composite pultruded products either in "I" profile or "Plate" profile of higher cross sectional area where said products consisting of plank of short fibers bagasse premixed with the said resin system as core is enclosed between the synthetic polyester felts impregnated with the resin system which is further enclosed between bi-directionally and/or uni-directionally oriented synthetic fabric selected from polyester, carbon, aramid, glass, basalt and mixtures thereof impregnated with the resin system. The system and method for the preparation of said composite pultruded products are also illustrated herein. These products lead to a significant reduction in weight and reduction in density with higher stiffness and
(Continued)

bending strength. The present composite products are encapsulated by fabrics in the peripheral area bringing more integrity uniformity of synthetic polyester felt materials. This leads to a significant cost reduction without sacrificing much tensile strength.

9 Claims, 4 Drawing Sheets

(51) Int. Cl.

| | | |
|---|---|---|
| *B32B 1/00* | (2006.01) | |
| *B32B 5/02* | (2006.01) | |
| *C08J 5/04* | (2006.01) | |
| *B29C 70/70* | (2006.01) | |
| *B29D 99/00* | (2010.01) | |

(52) U.S. Cl.
CPC ............ *B29C 70/528* (2013.01); *B29C 70/70* (2013.01); *B29D 99/0003* (2013.01); *B32B 1/00* (2013.01); *B32B 5/022* (2013.01); *C08J 5/046* (2013.01); *B32B 2260/021* (2013.01); *B32B 2260/046* (2013.01); *B32B 2262/0276* (2013.01); *B32B 2307/718* (2013.01); *C08J 2367/02* (2013.01); *C08J 2461/10* (2013.01)

(58) Field of Classification Search
CPC .............. B32B 5/022; B32B 2260/021; B32B 2260/046; B32B 2262/0276; B32B 2307/718; C08J 5/046; C08J 2367/02; C08J 2461/10
See application file for complete search history.

(56) References Cited

U.S. PATENT DOCUMENTS

| | | | | |
|---|---|---|---|---|
| 4,812,343 | A * | 3/1989 | Kiekhaefer | B29C 70/085 264/122 |
| 4,983,453 | A * | 1/1991 | Beall | B29C 70/083 156/179 |
| 5,316,834 | A * | 5/1994 | Matsuda | B32B 5/26 442/247 |
| 5,905,045 | A * | 5/1999 | Vockel, Jr. | B29C 33/60 442/43 |
| 9,688,030 | B2 * | 6/2017 | Kiilunen | B29C 70/521 |
| 2011/0204611 | A1 * | 8/2011 | Ziegler | B29C 70/521 280/781 |
| 2015/0224910 | A1 * | 8/2015 | Callens | D04H 3/04 428/113 |
| 2016/0273140 | A1 * | 9/2016 | Wu | E04C 2/46 |
| 2018/0311915 | A1 * | 11/2018 | Mukherji | B29C 70/521 |

* cited by examiner

COMPOSITES PRODUCT; A PULTRUSION CONTINUOUS METHOD FOR MANUFACTURING THEREOF

This application claims priority from Indian Patent Application No. 201621020446 filed on Jun. 15, 2016.

The present Indian Patent Application relates to Indian Patent Application No. 3985/MUM/2015 filed on 21 Oct. 2015. The system for continuous pultrusion production of a composite pultruded product from the said patent application is incorporated herein entirety as reference.

FIELD OF INVENTION

Present invention relates to the composite pultruded products consisting essentially synthetic polyester felt impregnated with resin system as core encapsulated between bi-directionally and uni-directionally oriented synthetic fabric impregnated with resin system; thereby improving the composite products and can be used as a high strength reinforcing filler, efficient structural beam or plate or panel in a modular structure, making low-cost product and reducing environmental impact.

It also relates to the composite pultruded products consisting essentially low-cost bagasse plank as a core encapsulated between synthetic polyester felt and oriented synthetic fabric; both impregnated with resin system; thereby improving the composite products and can be used as a high strength reinforcing filler, efficient structural beam or plate or panel in a modular structure, making low-cost product and making product biodegradable to some extent resulting in reducing environmental impact.

More particularly, the composites products of the invention are adapted to be used as shuttering Plywood and I & Plate beam for civil application.

It also relates to a continuous pultrusion method for production of the composite pultruded products; wherein said method reduce manufacturing cost, reduce environmental impact and improve composite product and can be used as efficient structural beam or plate or panel in a modular structure.

BACKGROUND OF THE INVENTION

Fiber reinforced polymer (FRP) composites have surpassed their initial target applications in the aerospace industry to become a viable material alternative in sporting goods, automotive, and construction industries. High performance FRP composites made with synthetic fibers such as carbon, glass or aramid embedded in polymeric matrices provide the advantages of high stiffness and strength to weight ratio and increased chemical inertness compared to conventional construction materials, i.e., wood, clay, concrete and steel. In spite of these advantages, the widespread use of synthetic FRP composites has been limited, among several factors, due to their higher initial material costs, their use in non-efficient structural forms and their environmental impact.

Increased environmental awareness and the interest in long-term sustainability of construction materials have thus challenged the development of environmentally friendly alternatives to synthetic oil-based FRP composites (Mohanty et al. *Macromol Mater Eng*, Vol. 276/277, 1-24 (2000)). Natural-fiber-reinforced polymer composites, or bio-composites, have emerged in the past decade as an environmentally friendly and cost-effective option to synthetic FRP composites. Despite the interest and environmental appeal of bio-composites, their use has been limited to non-primary, or non-load-bearing applications due to their lower strength and stiffness compared with synthetic FRP composites (Biswas et al., "Development of Natural Fiber Composites in India", Proceedings of the Composites Fabricators Association's Composites, Tampa, Fla. (2001)). Recent developments, however, have shown that the properties of "engineered" bio-composites (Mohanty et al., "Surface modifications of Natural Fibers and performance of the Resulting Bio-composites: An Overview," Composite Interfaces, 8, 313-343, (2001); and Mishra, S., et al., Composite Science and Technology 63, 1377-1385, (2003)) are a technical, economical, and environmentally conscious alternative to E-glass fiber reinforced composites (the most common synthetic fiber composite) without sacrificing performance. While bio-composite materials with specific properties equivalent to entry-level structural materials are feasible, this performance level is still not enough to make them able to compete with existing construction materials. However, the structural performance of a component depends on both its material and structural properties. The lower material stiffness of bio-composites can thus be overcome by using efficient structural configurations that place the material in specific locations for highest structural efficiency. Natural fibers embedded in a natural or synthetic polymeric matrix, known as bio-composites, have gained recent interest because of their low material and manufacturing costs, light weight, high specific modulus (elastic modulus over density), and environmentally friendly appeal (Mohanty et al., *Macromol Mater Eng*, Vol. 276/277, 1-24 (2000)). Natural fibers are categorized depending on their source as either leaf or bast fibers. Bast fibers have the highest mechanical properties and thus are ones typically considered for structural applications. The most common bast fibers are flax, hemp, jute, and kenaf. Typical mechanical properties of these fibers together with E-glass fibers are given in Table 1. All natural fibers are lingo-cellulosic in nature with the basic components being cellulose and lignin. The density of natural fibers is about half that of E-glass (Table 1), which makes their specific strength quite comparable, while the elastic modulus and specific modulus is comparable or even superior to E-glass fibers. Hybrid bio-composite cellular structures can be used in multi applications (e.g., building walls, floors and roofs, bridge and ship decks, aircraft floors) with tailorable integrated multi-functions (i.e., stiffness, strength, thermal insulation, fire protection, and user friendliness). The sustainability and social acceptance of the proposed components, stemming from its large constituency on rapidly renewable resources, will pioneer the use of agricultural commodities in markets aimed at load-bearing materials and structures.

TABLE 1

Mechanical Properties for Selected Natural Fibers and E-Glass Fiber

| Fiber Type | Density (g/cm$^3$) | Elastic Modulus (GPa) | Tensile Strength (MPa) | Specific Modulus (GPa/g/cm$^3$) | Specific Strength (MPa/g/cm$^3$) |
|---|---|---|---|---|---|
| E-glass | 2.55 | 73 | 2000-3500 | 29 | 780-1370 |
| Hemp | 1.48 | 70 | 690 | 47 | 466 |
| Flax | 1.4 | 60-80 | 345-1100 | 43-57 | 250-785 |
| Jute | 1.46 | 10-30 | 400-750 | 7-21 | 275-510 |
| Sisal | 1.33 | 38 | 450-640 | 29 | 340-480 |

Pultrusion is a process of continuously forming reinforced plastic materials having a uniform cross-sectional profile. The word "pultrusion" is a hybrid which combines the words "pull" and "extrusion". The product is literally pulled through a forming die. In its most usual form, pultrusion involves feeding a multiplicity of fiberglass roving strands, with or without additional plies of glass mat of appropriate width, into a pultrusion die. A resin, normally a thermosetting material such as polyester, is injected into the die where it is uniformly distributed among the reinforcing materials. Alternatively, the reinforcing material may be drawn through a resin bath prior to entry into the die. The die itself is heated. As the product is drawn from the die, the resin is either cured, or very nearly cured. The endless product so formed is then cut to appropriate length. Many variations of this general process have been developed as the technology has matured. Pultruded products are used in a great variety of applications. In many places they have replaced metallic construction materials, particularly those used in highly corrosive environments. Structural beams, floor gratings, handrails, ladders, and many similar products are now made by pultrusion process. A general background on pultrusion is found in an article by Martin, Modern Plastics Encyclopedia, pp. 40 317-318, McGraw-Hill, Inc., New York (1986).

U.S. Pat. No. 4,252,696 describes polyester resin compositions containing 4-10 parts of particular cellulose acetate butyrate resins per 100 parts of particular polyester resins which can be pultruded at greater speeds to give products having diminished surface roughness and internal and/or external cracking. These compositions have been found to give bulk or sheet molding compositions capable of producing thick moldings that are crack-free.

U.S. Pat. No. 4,541,884 describes pulling a continuous tow or roving of fibers through a mixture of a thermoplastic polymer and a volatile plasticizer. The plasticizer reduces the melt viscosity to achieve uniform impregnation of the reinforcing fibers. After forming the product, the plasticizer is volatilized. However, the reinforcing must have sufficient longitudinal strength to enable it to be drawn through the viscous impregnation bath. In this invention, at least 50% by volume of the fibers must be aligned in the direction of draw.

U.S. Pat. No. 4,028,477 describe a method for producing a pultruded product first by taking an open cell foamed core material and impregnating it with a thermosetting resin. The impregnated foam core is faced on one or both sides with a resin free fibrous reinforcing layer. The assembly is then molded in a pultrusion die where the resin flows from the foam into the reinforcement. The foam core is ultimately totally collapsed in the process. Cellulosic paper, cotton fabric, asbestos, nylon, and glass are disclosed as reinforcing materials.

Cellulosic materials have found very little use in any capacity in reinforced plastic materials based on polyester resins. They have had a long standing reputation, not without some justification, for causing soft cures and tacky surfaces. This has been particularly true for products based on wood fiber which have not been chemically modified. U.S. Pat. No. 3,361,690, describes the use of Douglassfirbark fiber as a reinforcing material for polyester-based bulk molding compounds. U.S. Pat. No. 3,248,467 describes the use of Douglassfirbark fiber as a reinforcing material in melamine overlaid reinforced plastic moldings. However, the bark fiber products appear to be an exception to the problems encountered with other cellulose based materials.

Purified cellulose has found widespread use in thermosetting resins such as impregnated phenolic and melamine laminates and molding compounds. However, it has not been generally regarded as useful in pultruded products. A few applications using helical wound paper have appeared in the patent literature. Japanese 'patent application No. 56-17245 describes the use of a low density (ca. 0.7 g/cc or lower) paper tube which serves as a permanent mandrel for a pultruded cylindrical shape. The resin and glass composite surrounding the tube is bonded only to the surface and the tube itself is not impregnated with resin. It's apparent that the process is not simple in commercial scale and not cost effective.

Fr 2,391,067 teaches the use of a plurality of reinforcing fiber bundles, each of which is wrapped with a barrier material of paper. These may then be used in pultruded or extruded products. The barrier material serves to prevent passage of resin into the reinforcing fiber bundles. It is important to impregnate the barrier layer.

U.S. Pat. No. 3,470,051 describes reinforced plastic rods either as hollow tubes or solid tubes which includes an outer layer of longitudinally extending, exactly parallel, reinforcing glass fibers roving, impregnated with a resin-emulsion. The outer layer may be formed on a core and the layer may be produced simultaneously. A relatively complex helically wound preformed and then used it as a core for pultruded products such as arrow shafts. The preform has a double layer of paper, then a layer of glass, and finally another layer of paper. This is then coated with resin and molded into a rod before use in the pultrusion process. But it has been found critical to make higher width, high thick profile product.

An early article describing the pultrusion process (*Machine Design*. 43, Dec. 26, 1971, pp. 45-49) speculates that any material that can be fed from a coil is a "possibility" for use in the pultrusion process. Paper products, along with a host of other materials, are suggested as being potentially useful.

U.S. Pat. No. 4,983,453 describe a composite pultruded product and the method for its manufacture. The product is made with a plurality of longitudinal glass roving strands. In addition, a cellulosic mat is used in association with the roving. The mat serves as a filler, or reinforcing filler. In the method, cellulose-based material is completely resin saturated and then co-pultruded with a reinforcing glass rovings. It has been found critical to have desire strength with paper products. The process of making product by using only cellulose material and even in combination with glass rovings leads to non-uniformity in physical properties.

In none of these cases is synthetic non-woven fabrics encapsulated resin impregnated synthetic polyester felts has been used for making continuous high thickness profiles and plates.

Despite the enormous versatility of the pultrusion method and many variations which have been developed around it, it still has limitations. In many cases it is necessary to overdesign products in order to ensure uniform distribution of the glass reinforcement within the resin matrix. Products with low glass content tend to show areas of resin separation in which the reinforcing material may be completely absent. This resin separation is apt to occur even when high concentrations of mineral fillers are used with the resin. Pultruded products also tend to have relatively high density in comparison to many other plastic composites. This results in a relatively high cost per unit volume of the finished product. Further, because of the problem of resin separation at low reinforcing fiber contents, it is very difficult to make products less than about three millimeters in thickness, even though they may not be required to have high strengths. While some attempts have been made in the prior art to address these deficiencies, none have been particularly successful to the present time. Again product with high cellulosic fiber has limitation of pull strength and moisture content.

Accordingly, there is a long felt need to develop a simple yet technically improved and economically significant process of preparing composites, which is fast and simple, and yields improved products having uniform mechanical property, light weight still enhanced tensile and bending strength and high endurance subject to dynamic application.

OBJECTS OF THE INVENTION

An object of the invention is to provide composite pultruded products; said composite products consisting essentially synthetic polyester felt impregnated with resin system as core encapsulated between bi-directionally and uni-directionally oriented synthetic fabric impregnated with resin system; said composite products can be used as a high strength and efficient structural beam or plate or panel in a modular structure, low-cost product and reducing environmental impact.

Another object of the invention is to provide bio-composite pultruded products consisting essentially low-cost bagasse plank as a core encapsulated between synthetic polyester felt and oriented synthetic fabric; both impregnated with resin system; said bio-composite products can be used as a high strength and efficient structural beam or plate or panel in a modular structure, making low-cost product and reducing environmental impact.

Yet another object of the invention is to provide composite pultruded products with uniform property and overcomes limitation of conventional overdesigned thin and thick glass reinforced composites products.

Still another object of the invention is to provide the composite pultruded products with improved low ratio of weight to strength.

Yet still another object of the invention is to provide the composite pultruded products with improved, thicker and wider profiles and plates products.

Yet still another object of the invention is to provide the composite pultruded products with more fatigue life than the conventional products and improved impact/tensile/bending strength than the conventional products.

Yet still another object of the invention is to provide the composite pultruded products eliminating use of conventional glass roving and overcomes the limitation of jamming of glass roving in resin bath.

Yet still another object of the invention is to provide the composite pultruded products which are adapted to be used as shuttering Plywood and I & Plate beam for civil application.

Additional object of the invention is to provide a continuous pultrusion method for production of the composite pultruded products; said process is reducing manufacturing cost, reducing environmental impact and improving composite products, which can be used as efficient structural beam or plate or panel in a modular structure.

BRIEF DESCRIPTION OF THE ACCOMPANYING DRAWINGS

FIG. 1 illustrates "Plate" profile of composite products:
A. Plate profiled bio-composite pultruded product having coextruded bagasse as core encapsulated with synthetic polyester felt which is further encapsulated with glass fabrics;
B. Plate profiled bio-composite pultruded product having synthetic polyester felt as core encapsulated with glass fabrics; and
C. Plate profiled bio-composite pultruded product having synthetic polyester felt as core encapsulated with polyester fabrics.

FIG. 2 illustrates "I"-profile of composite products:
A. "I" profiled bio-composite pultruded product having coextruded bagasse as core encapsulated with synthetic polyester felt which is further encapsulated with glass fabrics;
B. "I" profiled bio-composite pultruded product having synthetic polyester felt as core encapsulated with glass fabrics; and
C. "I" profiled bio-composite pultruded product having synthetic polyester felt as core encapsulated with polyester fabrics.

DETAILED DESCRIPTION OF THE INVENTION

The present invention as described below, it is to be understood that this invention is not limited to particular embodiments, drawings, methodologies and materials described, as these may vary as per the person skilled in the art. It is also to be understood that the terminology used in the description is for the purpose of describing the particular embodiments only, and is not intended to limit the scope of the present invention.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar or equivalent to those described herein can be used in the practice or testing of the present invention, the preferred methods and materials are described, as these may vary within the specification indicated. Unless stated to the contrary, any use of the words such as "including," "containing," "comprising," "having" and the like, means "including without limitation" shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further the terms disclosed embodiments are merely exemplary methods of the invention, which may be embodied in various forms.

It is also to be understood that the terms "a", "an", "the" and like are words for the sake of convenience and are not to be construed as limiting terms. Moreover, it will be understood that the illustrations are for the purpose of describing a particular exemplary embodiment of the invention and are not limited to the invention thereto.

The term "fibres" or "fibre" or "fabric" or "fabrics" are interchangeable and intends to cover single as well as plural fibre or fabric.

The term "Composite" may be read as "Bio-composite" in the specification where composite product comprises bagasse as one of the constituent.

Figure 1A:
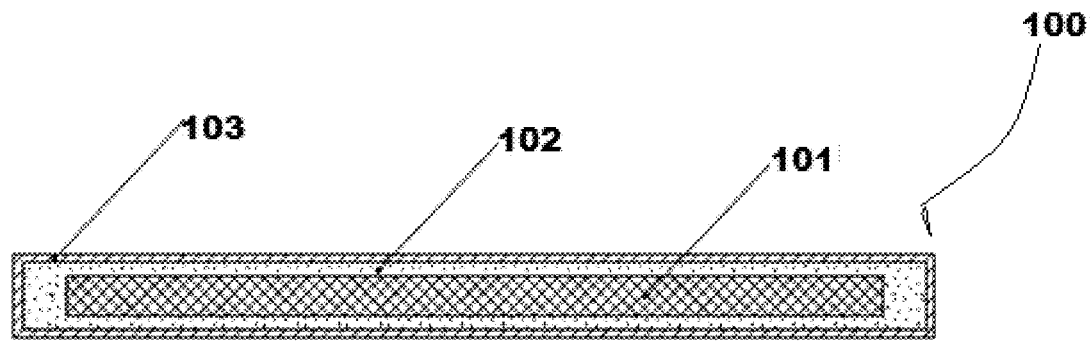
Figure 1B:
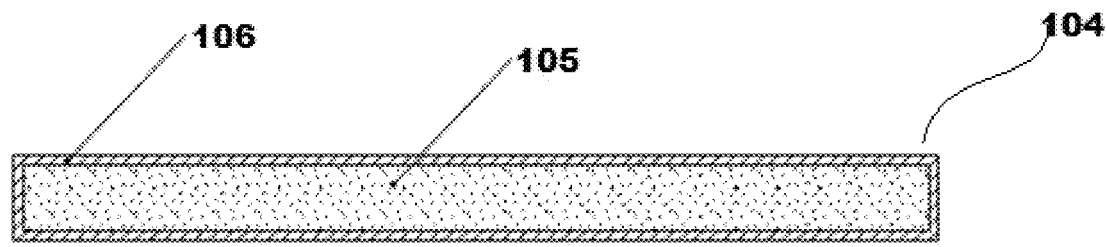

According to one of the embodiments of the invention, there is provided composite pultruded product consisting essentially synthetic polyester felt as core impregnated with a resin system, enclosed between bi-directionally and/or uni-directionally oriented synthetic fabric selected from polyester, carbon, aramid, glass, basalt and mixtures thereof impregnated with a resin system;

said bio-composite product is either in "Plate" profile [FIG. 1(B) or (C)] or "I" profile [FIG. 2 (B) or (C)]. Preferably, the product comprises 10 to 50% by vol. of synthetic polyester felt, 10 to 30% by vol. of synthetic fabric and 40 to 60% by vol. of resin system.

According to another embodiment of the invention there is provided another composite pultruded product consisting essentially plank of short fibers bagasse premixed with a resin system as core encapsulated between a synthetic polyester felt impregnated with the resin system which is further encapsulated between bi-directionally and/or uni-directionally oriented synthetic fabric selected from polyester, carbon, aramid, glass, basalt and mixtures thereof impregnated with the resin system;

said composite product is either in "Plate" profile [FIG. 1(A)] or "I" profile[FIG. 2 (A)].

Preferably, the product comprises 10 to 40% by vol. of synthetic polyester felt, 5 to 10% by vol. of synthetic fabric, 10 to 30% by vol. of bagasse short fibres and 40 to 60% by vol. of resin system.

Typically, the bagasse fibres are premixed with the resin system prior to extrusion in equal proportion.

The resin system used for impregnation of natural fibers or synthetic felt/fabric, comprise of at least a resin, curing system comprising curing agent and accelerator, filler, thinner, pigment or any other additives. Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, thinner is methanol.

Two types of resin systems are used in the present invention.

First type of the resin system comprises at least 100 parts per hundred (pph) of resin and at least 20 pph of Thinner. Particularly, the resin system comprises 100 pph of phenol formaldehyde resin and 20 pph of methanol.

Second type of the resin system comprises at least 100 pph of resin, at least 1.7 pph of curing system, at least 2 pph of filler, and at least 10 pph of thinner. Particularly, the resin system comprises 100 pph of polyester, 1.7 pph of curing system comprising 0.2 pph of cobalt octoate and 1.5 pph of benzoyl peroxide, 2 pph of calcium carbonate and 10 pph of methanol.

The synthetic polyester felt used in the composite products is in the form of needle punched mat having weight in the range of 400 to 1000 GSM. The needle punched mat of synthetic polyester felt is prepared from waste PET bottles to reduce the cost of production.

Synthetic polyester felt is required to be passed through IR heater for dehumidification so as to enhance resin affinity.

The core of the products may include coextruded bagasse plank or bagasse mixed with resin system and further coextruded into plank or natural fibers including mat impregnated with the resin system. However, use of combination of bagasse along with natural fibers including mat with or without the resin system should be considered within the scope of the invention.

DETAILED DESCRIPTION OF THE ACCOMPANYING DRAWINGS

FIG. 1(A) illustrates sectional view of Plate profiled composite product (100), where coextruded bagasse plank (101) as core encapsulated with synthetic polyester felt (102), which is further encapsulated with glass fabrics (103).

FIG. 1(B) illustrates sectional view of Plate profiled composite product (104), where synthetic polyester felt (105) as core which is encapsulated with glass fabrics (106).

Figure 1C:
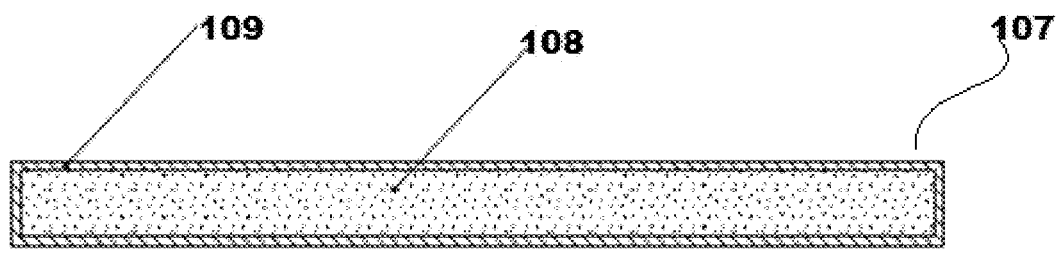

FIG. 1(C) illustrates sectional view Plate profiled composite product (107), where synthetic polyester felt (108) as core which is encapsulated with polyester fabrics (109).

Figures 2A, 2B, 2C:
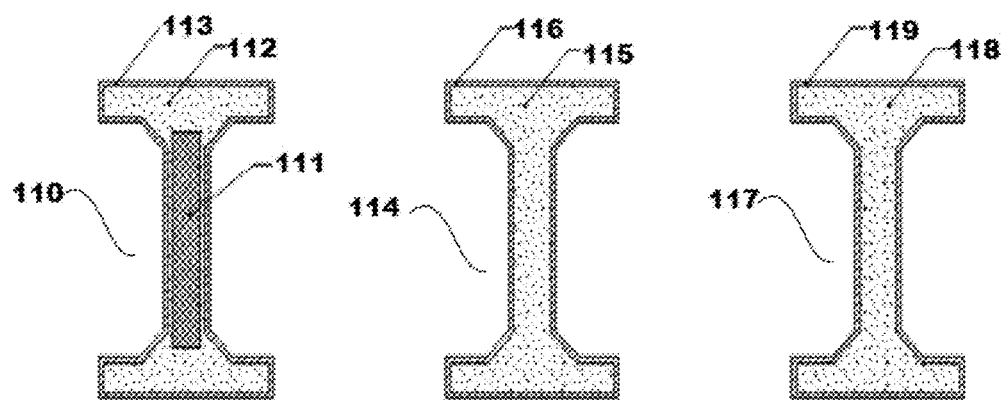

FIG. 2(A) illustrates sectional view of "I" profiled composite product (110), where coextruded bagasse plank (111) as core encapsulated with synthetic polyester felt (112), which is further encapsulated with glass fabrics (113).

FIG. 2(B) illustrates sectional view of "I" profiled composite product (114), where synthetic polyester felt (115) as core which is encapsulated with glass fabrics (116).

FIG. 2(C) illustrates sectional view of "I" profiled composite product (117), where synthetic polyester felt (118) as core which is encapsulated with polyester fabrics (119).

Figure 3:
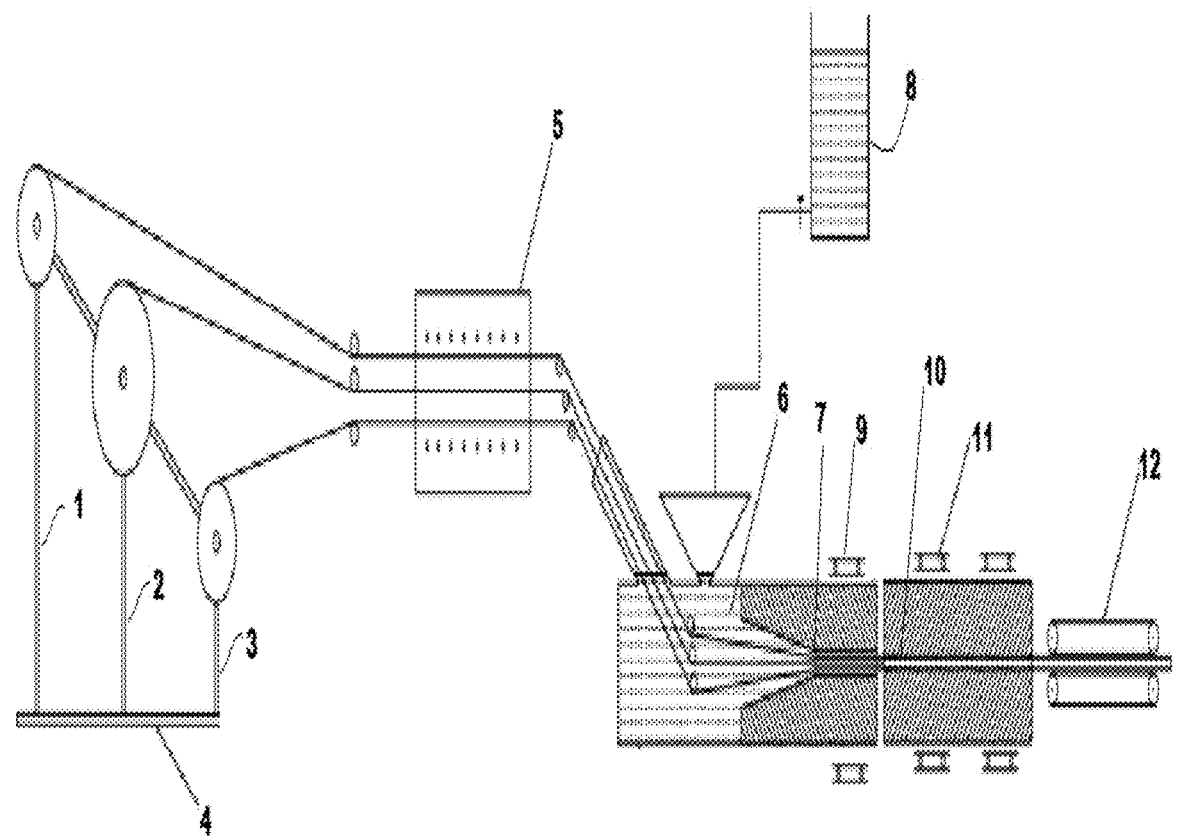
FIG. 3 illustrates a pultrusion apparatus for continuous production of a composite pultruded product; particularly "Plate" or "I" profiled as shown in FIGS. 1 (B) and (C) and FIGS. 2 (B) and (C).

The pultrusion system for continuous production of composite pultruded products of the invention is illustrated in FIG. 3.

In the FIG. 3, roller stands are used in place of conventionally used creel stand. Roller stand occupies less space as compared to creel stand.

The pultrusion system for continuous production of composite pultruded products of the invention comprises:

a roller stand (4) provided with at least three roller means (1, 2, 3) to feed at least one synthetic polyester felt and at least two synthetic fibres;

a heating means (5), preferably IR heater, said IR heater is in close proximity to roller means (1, 2, 3) of roller stands (4) so as to pass synthetic polyester felt and synthetic fibres through it to reduce moisture from thereof;

an enclosed resin bath (6) provided with a resin storage and charging unit (8) and preforming die (7) enclosed in it; said resin storage and charging unit adapted to provide resin system for impregnation of the fibres to said resin bath (6), and said preforming die (7) having die cavity about longitudinal axis and tapering at end so as to squeeze fibres impregnated with resin; said resin bath is in close proximity to said IR heater (5) so as to pass synthetic polyester felt and synthetic fibres through said resin bath followed by said preforming die cavity (7);

heating means (9), preferably heating plates provided to said preforming die (7) to encapsulate along its length; said die (7) being activable to heat to transfer a precured preform of squeezed resin impregnated fibres to further location;

a pultrusion die (10) provided in close proximity to said preforming die (7) so as to pass said precured preform of squeezed resin impregnated fibres through it;

heating means (11), preferably heating plates provided to said pultrusion die (10) to encapsulate along its length; said die (10) being activable to heat to transfer a cured pultruded bio-composite product to further location; and an external pultrusion puller (12) provided at the end of the system to pull said cured pultruded bio-composite product from said pultrusion die (10);

said cured pultruded composite product consisting essentially synthetic polyester felt impregnated with said resin system as core encapsulated between bi-directionally and/or uni-directionally oriented synthetic fabric impregnated with said resin system;

said composite product is either in "I" profile [FIG. 1(B) or (C)] or "Plate" profile[FIG. 2 (B) or (C)].

The step of reducing moisture by passing natural or synthetic fibres or fabric or mat through IR heater enhances affinity of the mats, fibres or fabrics towards the resin system. The ability of the mats, fibres or fabrics to readily absorb resin is essential for production of the composite products.

Typically, the synthetic polyester felt or synthetic fabric is passed through IR heater (5) by maintaining speed of 2 to 6 meter per hour of fibres/fabric/mat in it. After passing through IR heater, the natural fibre or synthetic fabric has 3 to 4% moisture.

Typically, the precured preform obtained from preforming die (7) is squeezed mats, fibres or fabrics which are at least 40% impregnated with the resin system.

Typically, the preforming die (7) having cavity designed to be adapted "I" profile or "Plate" profile.

Typically, "I" profiled die having cavity adapted to have dimension of 20 mm thick of I beam of flange with width 70 mm and height of 120 mm.

Typically, "Plate" profiled die having cavity adapted to have dimension of 8-16 mm thick and 600-1200 mm width.

Typically, the preforming die (7) is maintained at temperature in the range of 70 to 90° C. by using heating mean (9).

Typically, the pultrusion die (10) having cylindrical cavity die adapted to process precured "I" profiled or "Plate" profiled preform through it.

Typically, the pultrusion die (10) is maintained at temperature in the range of 160 to 180° C. by using heating mean (11).

Typically, the synthetic polyester felt and the synthetic fabric is passed at speed of 2 to 6 meter per hour through enclosed resin bath (6) for the impregnation of synthetic polyester felt and the synthetic fabric.

Typically, the resin impregnated felt or fabric is passed at speed of 2 to 6 meter per hour through the preforming die (7) to obtain precured "I" profiled or "Plate" profiled preform.

Typically the precured "I" profiled or "Plate" profiled preform is passed at speed of 2 to 6 meter per hour through the pultrusion die (10) to obtain cured "I" profiled or "Plate" profiled preform.

According to still another embodiment of the invention, there is provided a continuous pultrusion method for production of the composite pultruded products of the invention by using the system of the invention as illustrated in FIG. 3.

In this method, 10 to 50% by vol. of synthetic polyester felt are provided by roller mean (2) and 10 to 30% by vol. of synthetic fabric selected from polyester, carbon, aramid, glass, basalt and mixtures thereof are provided by roller means (1 and 3). These felts/fibres/fabrics are passed through IR heater (5) at speed of 2 to 6 meter per hour to reduce moisture from thereof. These felts/fibres/fabrics are impregnated by passing them at speed of 2 to 6 meter per hour through the resin bath (6) comprising a resin system followed by passing them at speed of 2 to 6 meter per hour through a preforming die (7) under heating at temperature in the range of 70 to 90° C. by using heating means (9) to obtain a precured preform of squeezed felts/fibres/fabrics impregnated with the said resin system. The precured preform of squeezed fibres impregnated with the resin system is transferred from the said die (7) to pultrusion die (10); die (7) is activable to heat to transfer said precured preform to pultrusion die (10). The said precured preform is passed at speed of 2 to 6 meter per hour through pultrusion die (10) under heating at temperature in the range of 160 to 180° C. using heating means (11) to obtain a cured pultruded hybrid composite product. The said die (10) being activable to heat to transfer and expel said cured pultruded composite product. The said cured pultruded composite product is pulled by external pultrusion puller (12).

Typically, the precured preform of squeezed felts/fibres/fabrics impregnated with the resin system obtained from preforming die (7) is either "I" profiled or "Plate" profiled.

The above described system and corresponding continuous pultrusion method is used to produce the said pultruded composite product consisting essentially synthetic polyester felt impregnated with the resin system as core encapsulated between bi-directionally and uni-directionally synthetic fabric impregnated with the resin system;

said composite products are either "I" profiled [see FIG. 1 (B) or (C)] or "Plate" profiled [see FIG. 2 (B) or (C)].

Preferably, the product comprises 10 to 50% by vol. of synthetic polyester felt, 10 to 30% by vol. of synthetic fabric and 40 to 60% by vol. of resin system.

Preferably, the synthetic polyester felt used is preferably unsaturated polyester felt, more preferably needle punched mat prepared from waste PET bottles having weight 400 to 1000 GSM.

Preferably, said synthetic fabric having a moisture content of 5% or less, weight of 100 to 600 gm/m$^2$ and tensile strength of 400 to 500 MPa. Preferably, the synthetic fabric is preferably glass fabric.

The resin system used for impregnation of synthetic polyester or synthetic fabric, comprise of at least a resin, curing system comprising curing agent and accelerator, filler, thinner, pigment or any other additives. Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, the thinner is methanol.

Typically, two types of resin systems used in the present invention.

First type of the resin system comprises at least 100 parts per hundred (pph) of resin and at least 20 pph of thinner. Particularly, the resin system comprises 100 pph of phenol formaldehyde resin and 20 pph of methanol (as thinner).

Second type of the resin system comprises at least 100 pph of resin, at least 1.7 pph of curing system, at least 2 pph of filler, and at least 10 pph of thinner.

Particularly, the resin system comprises 100 pph of polyester, 1.7 pph of curing system comprising 0.2 pph of cobalt octoate and 1.5 pph of benzoyl peroxide, 2 pph of calcium carbonate (filler) and 10 pph of methanol (thinner).

Figure 4:
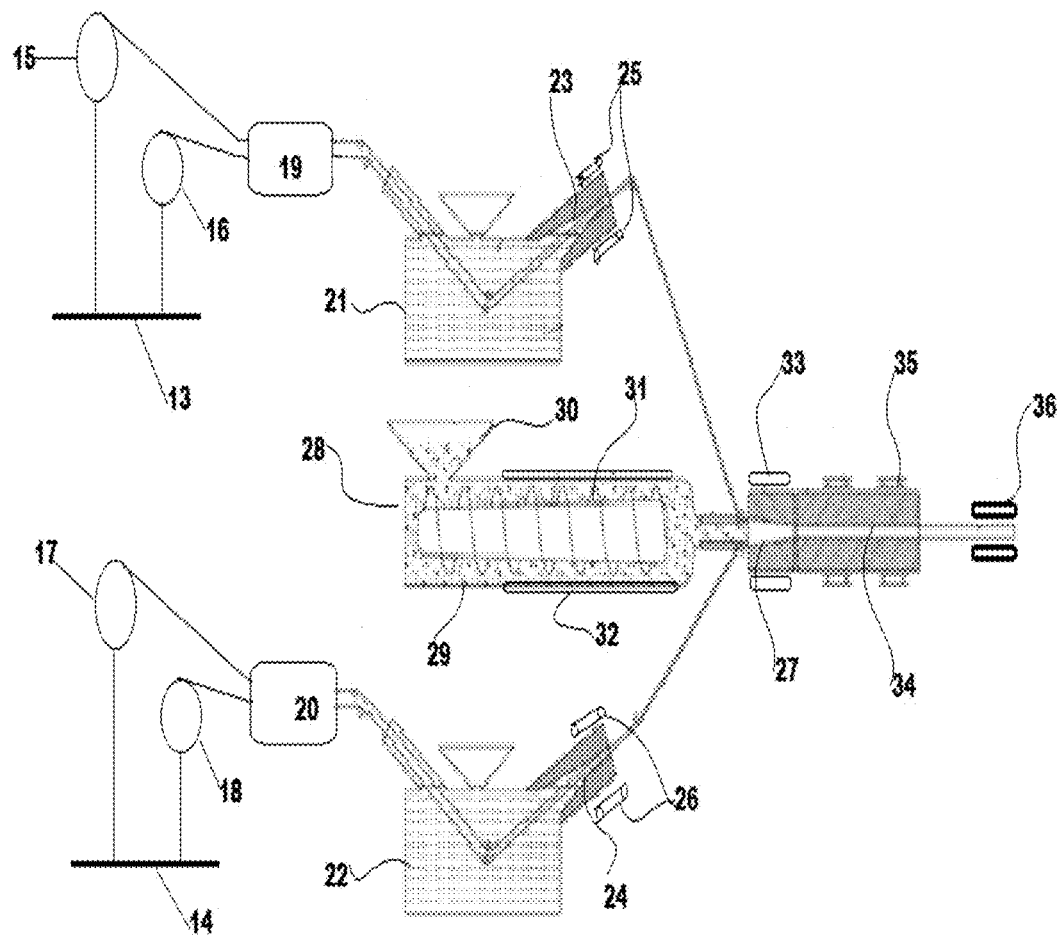
FIG. 4 illustrates a pultrusion apparatus for continuous production of a composite pultruded product; particularly "Plate" or "I" profiled as shown in FIG. 1 (A) and FIG. 2 (A).

Another pultrusion system for continuous production of another composite pultruded product of the invention is illustrated in FIG. 4.

In the FIG. 4, the system comprising:

at least two roller stands (13 and 14), each roller stand provided with at least two roller means (15,16) and (17, 18) to feed synthetic polyester felt and synthetic fabric;

heating means (19, 20), preferably IR heater; said IR heater (19, 20) is in close proximity to said each roller means (15,16) and (17, 18) so as to pass felts/fibres/fabrics through the heater to reduce moisture from thereof;

enclosed resin baths (21, 22) containing resin system for impregnation of the felts/fibres/fabrics in close proximity to said each IR heater (19, 20); said each resin bath (21, 22) provided with preforming die "A" (23, 24) enclosed in it respectively; and said preforming die "A" (23, 24) having die cavity about longitudinal axis which is tapering at end so as to squeeze felts/fibres/fabrics impregnated with the resin system; pressurising means (25, 26) provided to said preforming die "A" (23, 24) to encapsulate said die "A" (23, 24) along its length; said die "A" (23, 24) being activable to pressure to transfer said squeezed resin impregnated felts/fibres/fabrics to further location;

a screw extruder (28) comprising a barrel (29) connected to hopper (30) at one end, screw (31) along its longitudinal axis and pressure means (32) along its longitudinal axis; said hopper provides means for supplying short fibres of bagasse to produce a bagasse plank;

a preforming die "B" (27) in close proximity to said screw extruder (28) as well as said preforming dies "A" (23, 24) to enable to pass a bagasse plank from said extruder (28) and squeezed resin impregnated felts/fibres/fabrics from said die "A" (23, 24) for further processing to form a precured preform; said preforming die "B" (27) having long cylindrical cavity about longitudinal axis with tapering end; heating means (33) provided to encapsulate said preforming die "B" (27) along its length; said die "B" (27) being activable to heat to transfer said precured preform to further location;

a pultrusion die (34) in close proximity to said preforming die "B" (27); said pultrusion die (34) having slit die with uniform dimension along its length to process precured preform further;

heating means (35) provided to encapsulate said pultrusion die (34) along its length; said pultrusion die (34) being activable to heat to cure preform and transfer to expel cured pultruded bio-composite products to further location; and external pultrusion puller (36) for pulling out said cured bio-composite pultruded product;

said pultruded composite product consisting plank of short fibers bagasse premixed with resin system as core encapsulated between the synthetic polyester felts impregnated with the resin system which is further encapsulated between bi-directionally and uni-directionally oriented synthetic fabric selected from polyester, carbon, aramid, glass, basalt and mixtures thereof impregnated with the resin system; said composite product is either "I" profiled [FIG. 1(A)] or "Plate" profiled [FIG. 2 (A)].

The step of reducing moisture enhances affinity of the felts/fibres/fabrics towards the resin system. The ability of the felts/fibres/fabrics to readily absorb resin is essential for production of the composite products. The resin system used in the invention consists of a resin, a curing system comprising curing agent and an accelerator, a pigment, filler, thinner or any other additives for impregnation of the felts/fibres/fabrics. The said hooper provides means for supplying short fibers of bagasse. The said preforming die "B" (27) having a cavity about longitudinal axis and tapering at end and said pultrusion die (34) having slit die with uniform dimension along its length. Thus, the precured preform obtained is squeezed felts/fibres/fabrics which are at least 40% impregnated with the resin system.

Typically, the synthetic polyester felts or synthetic fabrics are passed through IR heaters (19, 20) by maintaining speed of 2 to 6 meter per hour of felts/fibres/fabrics in it. After passing through IR heater, the felts/fibres/fabrics have 3 to 4% moisture.

Typically, the preforming die "A" (23, 24) having cavity about longitudinal axis which is tapering at end so as to remove excess resin system and obtain said resin system impregnated squeezed felts/fibres/fabrics.

Typically, the preforming die "A" (23, 24) is activable under pressure using pressurizing means (25,26) to transfer squeezed resin impregnated felts/fibres/fabrics to said preforming die "B" (27).

Typically, preforming die "B" (27) having cavity designed to be adapted "I" profile or "Plate" profile.

Typically, "I" profiled die having cavity adapted to have dimension of 20 mm thick I beam of flange with width 70 mm and height of 100 to 120 mm.

Typically, "Plate" profiled die having cavity adapted to have dimension of 8 to 16 mm thick, 600 to 1200 mm of width.

Typically, the preforming die "B" (27) is maintained at temperature in the range of 70 to 90° C. by using heating means (35).

Typically, the pultrusion die (34) having cylindrical cavity die adapted to process "I" profiled or "Plate" profiled precured preform through it.

Typically, the pultrusion die (34) is maintained at temperature in the range of 160 to 180° C. by using heating means (36).

Typically, the felts/fibres/fabrics are passed at speed 2 to 6 meter per hour through enclosed resin baths (21, 22) to obtain impregnated fibres with the resin system.

Typically, the squeezed impregnated felts/fibres/fabrics are passed at speed 2 to 6 meter per hour through the preforming die "A" (23, 24) to obtain squeezed felts/fibres/fabrics impregnated with the resin system.

Typically, the squeezed impregnated felts/fibres/fabrics and bagasse plank are passed at speed 2 to 6 meter per hour through the preforming die "B" (27) to obtain said precured preform.

Typically, the said precured preform passed at speed 2 to 6 meter per hour through the pultrusion die (34) to obtain cured hybrid pultruded composite product.

According to another additional embodiment of the invention, there is provided another continuous pultrusion method for production of another composite pultruded product of the invention by using system of the invention as illustrated in FIG. 4.

In this method, 10 to 40% by vol. of synthetic polyester felts are provided from roller mean (16 and 17) and 5 to 10% by vol. of synthetic fabric selected from polyester, carbon, aramid, glass, basalt and mixtures thereof is provided from roller mean (15 and 18). These felts/fibres/fabrics are passed through IR heater (19, 20) at speed of 2 to 6 meter per hour to reduce moisture from thereof. After reducing the moisture, the said felts/fibres/fabrics are impregnated by passing them at speed of 2 to 6 meter per hour through resin bath (21, 22) comprising resin system consisting of at least a resin, a curing agent, an accelerator, pigment or any other additives. These impregnated felts/fibres/fabrics with the resin system are passed at speed of 2 to 6 meter per hour through preforming die "A" (23, 24) under pressure using pressurising means (25,26) to obtain squeezed felts/fibres/fabrics impregnated with the resin system. The squeezed felts/fibres/fabrics impregnated with resin system are transferred to preforming die "B" (27).

A plank from short fibres of bagasse is prepared by extruding short fibres of bagasse premixed with a resin system using the screw extruder (28) comprises supplying 10 to 30% by vol. of short fibres of bagasse premixed with a resin system in equal proportion through a hooper (30) to a barrel (29) having a screw (31) along its longitudinal axis and extruding it a at rotational speed of 20-30 RPM with 10 L/D ratio into plank. The extruded bagasse plank is transferred from the screw extruder (28) to a preforming die "B" (27). The extruded bagasse plank and two squeezed fibres impregnated with resin system are passed at speed of 2 to 6 meter per hour through the said preforming die "B" (27) under heating at temperature in the range of 70 to 90° C. using heating means (33), said two squeezed felts/fibres/fabrics are positioned above and below the extruded bagasse plank so as to encapsulate the bagasse plank between the synthetic polyester felts impregnated with the resin system which is further encapsulated by bi-directionally and/or uni-directionally oriented synthetic fabric selected from polyester, carbon, aramid, glass, basalt and mixtures thereof impregnated with the resin system and obtain precured preform of encapsulated composite product.

The precured preform of encapsulated composite product is finally passed at speed of 2 to 6 meter per hour through pultrusion die (34) under heating at temperature in the range of 160 to 180° C. using heating means (35) so as to obtain cured composite pultruded product and expel it as it is activable under heating.

The cured pultruded composite product is pulled out by external pultrusion puller (36).

The said cured pultruded composite product obtained by using the above-mentioned system and the above-mentioned method consisting plank of short fibers bagasse premixed with a resin system as core encapsulated between the synthetic polyester felts impregnated with the resin system which is further encapsulated between bi-directionally and/or uni-directionally oriented synthetic fabric selected from polyester, carbon, aramid, glass, basalt and mixtures thereof impregnated with the resin system. The said composite product is either "I" profiled [FIG. 1(A)] or "Plate" profiled [FIG. 2 (A)].

Preferably, the product comprises 10 to 40% by vol. of synthetic polyester felt, 5 to 10% by vol. of synthetic fabric, 10 to 30% by vol. of bagasse short fibres and 40 to 60% by vol. of resin system.

The synthetic polyester felt used in the composite products of the invention is in the form of needle punched mat having weight in the range of 400 to 1000 GSM. The needle punched mat of synthetic polyester felt is prepared from waste PET bottles to reduce the cost of production.

PET beverage bottles are converted into fibers and different production techniques are available for the same. Thus, the following production technique should be considered to be exemplary, and not limiting, as long as resulting to PET derived polyester fibers. The exemplary fiber production technique is based on pelletizing the PET bottles, melting the pellets to generate molten polyester, and passing the molten polyester through a screen or grating having predefined pore sizes (the pore sizes control the diameter of the resulting individual polyester fibers). The polyester fibers are cut to the desired length. The polyester fibers are carded (also referred to as combing) to align the individual fibers. The aligned fibers are then used to generate the PET derived polyester fiber based non-woven mat by needle punching. In some embodiments, some amount of recycled synthetic fibers from other sources (such as shredded carpet, textiles, and clothing) can be added to the PET derived polyester fiber. In an exemplary embodiment, the PET derived polyester fiber is formed into a mat weighing about 400 to about 1000 GSM. The needle punched mat of synthetic polyester felt have following properties namely; Mass (ASTM D 5261) 1000 GSM; Tensile Strength (Wide Width) (ASTM D 4595) 40 KN/m; Elongation (ASTM D 4595) 55%; Grab Tensile Strength (ASTM D 4632) 1850 N; Grab Tensile Elongation (ASTM D 4632) >55%; CBR (ASTM D 6241) 4500 N; Opening Size (O90) (ASTM D 4751) 60 Microns; Thickness 4 mm; and Trap Tear (ASTM D 4533) 950 N.

Preferably, said synthetic fabric having a moisture content of 5% or less, weight of 100 to 600 gm/m$^2$, and tensile strength of 400 to 500 MPa.

Preferably, the synthetic fabric is selected from bi-directionally and/or uni-directionally oriented synthetic fabric selected from polyester, carbon, aramid, glass, basalt and mixtures thereof, more preferably glass fabric.

The resin system used for impregnation of felts/fibres/fabrics, comprise of at least a resin, curing system comprising curing agent and accelerator, filler, thinner, pigment or any other additives.

Particularly, the resin used in the resin system is either a thermosetting resin selected from unsaturated polyester, epoxy, polyurethane, phenolic resins and mixture thereof or a thermoplastic resin selected from polyethylene, polypropylene, acrylonitrile-butadiene-styrene, polyacetal, polyamide, polyimide, saturated polyester resins and mixtures thereof.

Particularly, the curing agent used in the resin system is selected from methyl ethyl ketone peroxide, cumene hydroperoxide, t-butyl hydroperoxide, benzoyl peroxide, and/or hydrogen peroxide.

Particularly, the accelerators used in the resin system is selected from cobalt naphthenate and/or cobalt octoate.

Particularly, the filler used in the resin system is calcium carbonate.

Particularly, the thinner is methanol.

Two types of resin systems are used in the present invention.

First type of the resin system comprises at least 100 parts per hundred (pph) of resin and at least 20 pph of thinner.

Particularly, the resin system comprises 100 pph of phenol formaldehyde resin and 20 pph of methanol (thinner).

Second type of the resin system comprises at least 100 pph of resin, at least 1.7 pph of curing system, at least 2 pph of filler, and at least 10 pph of thinner.

Particularly, the resin system comprises 100 pph of polyester, 1.7 pph of curing system comprising 1 pph tertiary butyl perbenzoate; 0.2 pph of cobalt octoate and 1.5 pph of benzoyl peroxide, 2 pph of calcium carbonate (filler) and 10 pph of methanol (thinner).

Particularly, another resin system comprises 100 pph of unsaturated polyester resins (Aropol), 1.7 pph of curing system comprising 1 pph tertiary butyl perbenzoate; 0.2 pph of cobalt octoate and 1.5 pph of benzoyl peroxide, 2 pph of calcium carbonate (filler) and 10 pph of methanol (thinner).

Typically, the bagasse fibres are premixed with the resin system prior to extrusion in equal proportion.

Typically, bale form bagasse is crushed to form smaller particle size bagasse, followed by moisture reduction by passing through IR heater to reduce the moisture to 3 to 4% and then premixed with said resin system in equal proportion to be used in the present invention.

The post forming die may be heated and may be incorporated in the puller mechanism or may be separate. Alternatively one or more of the felts/fibres/fabrics supplied to the pultrusion die may be pre-impregnated with resin in bath. Bath may be located either before or after former.

Thus, pultrusion systems for continuous production of composite pultruded products of the invention eliminates wastage of material due to spilling of raw material during the manufacture thus making it clean, cost effective and efficient. The preforming die of the system is specially designed to have a cavity about longitudinal axis with a shape of either "I" or "Plate" profile and tapering at end so as to overcome the limitation of feeding impregnated reinforcing felts/fibres/fabrics into intricate die. The present system has roller stand instead of creel stand for feeding felts/fibres/fabrics which uses less space as compared to conventional creel stand. Thus, the current method reduces manufacturing cost, reduces environmental impact and improves composite products, which can be used as efficient structural beam or plate or panel in a modular structure. The composite products of the invention have uniform property and overcome limitation of conventional overdesigned thin and thick glass reinforced composites products. Also said products are with improved low ratio of weight to strength as well as said products are with improved, thicker and wider profiles and plates products. The said products with improved bio-based hybrid advanced composites, thereby having more fatigue life than the conventional natural fibre composites. The products of the invention have more impact/tensile/bending strength than the conventional composites products. Thus, said products eliminates use of conventional glass roving and overcomes the limitation of jamming of glass roving in resin bath. The present invention increase uniformity of the property and the strength of bagasse pultruded products by encapsulating the peripheral areas by synthetic fabrics more accurately glass fabrics and polyester fabrics or in combination thereof.

BEST MODE OR EXAMPLES FOR WORKING OF THE INVENTION

The present invention is described in the examples given below; further these are provided only to illustrate the invention and therefore should not be construed to limit the scope of the invention.

Example 1

A Product "Plate" Profiled

"Plate" profiled flat pultruded product having a cross section 8×1000 mm was made with 20% unidirectional glass fabric, 24% synthetic polyester felt (need to use specific trade name), and 56% resin system, all measured by volume.

The needle punched mat prepared from PET bottles having weight of 1000 g/m2. (manufactured by CAPITOL Non Oven Private Ltd).

24% by vol. of synthetic polyester felt was provided by roller mean (2) and 20% by vol. of unidirectional glass fabric of 200 g/m$^2$ was provided by roller means (1 and 3). These felts/fabrics were passed through IR heater (5) at speed 4 meter per hour to reduce moisture to 3 to 4%. These felts/fabrics were impregnated by passing them at speed 4 meter per hour through the resin bath (6) comprising a resin system consisting of 100 part phenol formaldehyde (68 to 72% resole type phenol formaldehyde in water supplied by Shivam polymer Pvt. Ltd.) and 20 parts methanol. The impregnated fabrics and felts were passed through a preforming die (7) having cavity of plate profile of dimension i.e. 8 mm thick and 1000 mm width at speed 4 meter per hour and at temperature 80° C. to obtain a precured "Plate" profile resin squeezed preform. This precured preform was further passed through the pultrusion die (10) at speed 4 meter per hour and at temperature 170° C. using heating means (11) to obtain a cured pultruded composite product of "Plate" profiled. "Plate" profiled pultruded bio-composite product from the said pultrusion die (10) was pulled out with the help of an external pultrusion puller (12).

Example 2

B Product "Plate" Profiled

"Plate" profiled flat pultruded product having a cross section 8×1000 mm was made with 15% unidirectional glass fabric, 35% synthetic polyester felts, and 50% resin system, all measured by volume by following same method as described in Example 1.

Example 3

C Product "Plate" Profiled

"Plate" profiled flat pultruded product having a cross section 8×1000 mm was made with 10% unidirectional glass fabric, 45% synthetic polyester felts, and 45% resin system, all measured by volume by following same method as described in Example 1.

Example 4

D Product "Plate" Profiled

"Plate" profiled flat pultruded product having a cross section 8×1000 mm was made with 20% bidirectional glass fabric, 24% synthetic polyester felts, and 56% resin system, all measured by volume by following same method as described in Example 1.

Example 5

E Product "Plate" Profiled

"Plate" profiled flat pultruded product having a cross section 8×1000 mm was made with 15% bidirectional glass fabric, 35% synthetic polyester felts, and 50% resin system, all measured by volume by following same method as described in Example 1.

Example 6

F Product "Plate" Profiled

"Plate" profiled flat pultruded product having a cross section 8×1000 mm was made with 10% bidirectional glass fabric, 45% synthetic polyester felts, and 45% resin system, all measured by volume by following same method as described in Example 1.

Example 7

G Product "Plate" Profiled

"Plate" profiled flat pultruded product having a cross section 8×1000 mm was made with 30% polyester fabric, 14% synthetic polyester felts, and 56% resin system, all measured by volume by following same method as described in Example 1.

Example 8

H Product "Plate" Profiled

"Plate" profiled flat pultruded product having a cross section 8×1000 mm was made with 25% polyester fabric, 25% synthetic polyester felts, and 50% resin system, all measured by volume by following same method as described in Example 1.

Example 9

I Product "Plate" Profiled

"Plate" profiled flat pultruded product having a cross section 8×1000 mm was made with 20% polyester fabric, 35% synthetic polyester felts, and 45% resin system, all measured by volume by following same method as described in Example 1.

The Plate profiled composite products prepared according to examples 1 to 9 were analyzed for its density, modulus of elasticity, modulus of rupture and impact strength and the results of the same are tabulated in Table 2.

TABLE 2

| Fabrics Type | Volume % | | | Bio-composite product | Density $kg/m^3$ | Modulus of Elasticity GPa | Modulus of Rupture MPa | Impact Strength |
| --- | --- | --- | --- | --- | --- | --- | --- | --- |
| | Synthetic Fabrics Reinforcement | Synthetic Polyester Felts | Resin system | | | | | |
| Unidirectional Glass Fabric | 20 | 24 | 56 | A | 1,750 | 26.0 | 392 | 75 |
| | 15 | 35 | 50 | B | 1,680 | 30.0 | 395 | 68 |
| | 15 | 45 | 45 | C | 1,680 | 32.5 | 380 | 59 |
| Bidirectional Glass Fabric | 20 | 24 | 56 | D | 1,750 | 25.4 | 419 | 78 |
| | 15 | 35 | 50 | E | 1,520 | 30.8 | 408 | 79 |
| | 10 | 45 | 45 | F | 1,420 | 35.5 | 312 | 69 |
| Polyester Fabrics | 30 | 14 | 56 | G | 1,680 | 24.5 | 350 | 65 |
| | 25 | 25 | 50 | H | 1,580 | 30.0 | 335 | 64 |
| | 20 | 35 | 45 | I | 1,520 | 31.2 | 310 | 60 |

These composite pultruded products obtained according to examples 1 to 9, wherein increasing synthetic polyester felt amount and reducing synthetic fabric leads to significant reduction in density as well as in weight. This also leads to a significant reduction of cost. The present composite products are encapsulated by fabrics in the peripheral area thus bringing more integrity uniformity of synthetic polyester felts materials further increasing stiffness of the product.

Example 10

J Product "Plate" Profiled

"Plate" profiled flat pultruded product having a cross section 8×1000 mm was made with 20% unidirectional glass fabric, 24% synthetic polyester felt (need to use specific trade name), and 56% resin system, all measured by volume following same method as described in Example 1 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 11

K Product "Plate" Profiled

"Plate" profiled flat pultruded product having a cross section 8×1000 mm was made with 15% unidirectional glass fabric, 35% synthetic polyester felts, and 50% resin system, all measured by volume by following same method as described in Example 2 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 12

L Product "Plate" Profiled

"Plate" profiled flat pultruded product having a cross section 8×1000 mm was made with 10% unidirectional glass fabric, 45% synthetic polyester felts, and 45% resin system, all measured by volume by following same method as described in Example 3 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 13

M Product "Plate" Profiled

"Plate" profiled flat pultruded product having a cross section 8×1000 mm was made with 20% bidirectional glass fabric, 24% synthetic polyester felts, and 56% resin system, all measured by volume by following same method as described in Example 4 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 14

N Product "Plate" Profiled

"Plate" profiled flat pultruded product having a cross section 8×1000 mm was made with 15% bidirectional glass fabric, 35% synthetic polyester felts, and 50% resin system, all measured by volume by following same method as described in Example 5 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 15

O Product "Plate" Profiled

"Plate" profiled flat pultruded product having a cross section 8×1000 mm was made with 10% bidirectional glass fabric, 45% synthetic polyester felts, and 45% resin system, all measured by volume by following same method as described in Example 6 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 18

R Product "Plate" Profiled

"Plate" profiled flat pultruded product having a cross section 8×1000 mm was made with 20% polyester fabric, 35% synthetic polyester felts, and 45% resin system, all measured by volume by following same method as described in Example 9 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

The Plate profiled biocomposite products prepared according to examples 11 to 18 were analyzed for its density, modulus of elasticity, modulus of rupture and impact strength and the results of the same are tabulated in Table 3.

TABLE 3

| Fabrics Type | Volume % | | | Bio-composite product | Density kg/m³ | Modulus of Elasticity GPa | Modulus of Rupture MPa | Impact Strength |
| --- | --- | --- | --- | --- | --- | --- | --- | --- |
| | Synthetic Fabrics Reinforcement | Synthetic Polyester Felts | Resin system | | | | | |
| Unidirectional Glass Fabric | 20 | 24 | 56 | J | 1,710 | 24.0 | 392 | 75 |
| | 15 | 35 | 50 | K | 1,620 | 29.0 | 395 | 68 |
| | 15 | 45 | 45 | L | 1,630 | 32.5 | 380 | 59 |
| Bidirectional Glass Fabric | 20 | 24 | 56 | M | 1,720 | 20.4 | 419 | 78 |
| | 15 | 35 | 50 | N | 1,500 | 29.8 | 408 | 79 |
| | 10 | 45 | 45 | O | 1,400 | 35.5 | 312 | 69 |
| Polyester Fabrics | 30 | 14 | 56 | P | 1,600 | 24.5 | 350 | 65 |
| | 25 | 25 | 50 | Q | 1,530 | 29.0 | 335 | 64 |
| | 20 | 35 | 45 | R | 1,500 | 26.2 | 310 | 60 |

Example 16

P Product "Plate" Profiled

"Plate" profiled flat pultruded product having a cross section 8×1000 mm was made with 30% polyester fabric, 14% synthetic polyester felts, and 56% resin system, all measured by volume by following same method as described in Example 7 except resin system used here comprises 100 pph of unsaturated polyester resins (Aropol); 1.7 pph of curing system comprising 1 pph tertiary butyl perbenzoate; 0.2 pph of cobalt octoate and 1.5 pph of benzoyl peroxide; 2 pph of calcium carbonate (filler) and 10 pph of methanol (thinner).

Example 17

Q Product "Plate" Profiled

"Plate" profiled flat pultruded product having a cross section 8×1000 mm was made with 25% polyester fabric, 25% synthetic polyester felts, and 50% resin system, all measured by volume by following same method as described in Example 8 except resin system used here comprises 100 pph of unsaturated polyester resins (Aropol); 1.7 pph of curing system comprising 1 pph tertiary butyl perbenzoate; 0.2 pph of cobalt octoate and 1.5 pph of These composite pultruded products obtained according to examples 10 to 18, wherein increasing synthetic polyester felt amount and reducing synthetic fabric leads to significant reduction in density as well as weight. This also leads to a significant reduction of cost. The present composite products are encapsulated by fabrics in the peripheral area thus bringing more integrity uniformity of synthetic polyester felts materials further increasing stiffness of the product.

Example 19

AA Biocomposite Product "I" Profiled

"I" profiled flat pultruded product having dimension of 20 mm thick of I beam of flange with width of 70 mm and height of 120 mm was made with 10% unidirectional glass fabric, 30% of bagasse; 14% synthetic polyester felt, and 46% resin system, all measured by volume.

The needle punched mat prepared from PET bottles having weight of 1000 g/m2. (manufactured by CAPITOL Non Oven Private Ltd).

14% by vol. of synthetic polyester felts was provided from roller means (16 and 17) and 10% by vol. of unidirectional glass fabric (200 g/m²) was provided from roller mean (15 and 18). These felts/fabrics were passed through IR heater (19, 20) at speed of 4 meter per hour to reduce moisture (3 to 4%). After moisture reduction, the said felts/fabrics were impregnated by passing through resin bath (21, 22) comprising resin system consisting of 100 parts of polyester (82% by vol. of unsaturated polyester in styrene supplied by Satyen Polymers Pvt. Ltd), 0.2 parts of cobalt octoate, 1.5 parts of Benzyl Peroxide, 2 parts of Calcium Carbonate, and 10 parts of methanol. These impregnated felts/fabrics with the resin system were passed at speed of 4 meter per hour through preforming die "A" (23, 24) under pressure using pressurising means (25,26) to obtain squeezed felts/fabrics impregnated with the resin system. The squeezed resin impregnated felts/fabrics was transferred to preforming die "B" (27).

A plank of 15 mm thick and 1800 g/m² basis weight was prepared from short fibres of bagasse by extruding 30% by vol. of short fibres of bagasse premixed with the resin system (i.e. 100 parts of Polyester (82% by vol. of unsaturated polyester in styrene supplied by Satyen Polymers Pvt. Ltd), 0.2 parts of cobalt octoate, 1.5 parts of Benzyl Peroxide, 2 parts of Calcium Carbonate, and 10 parts of methanol) in equal proportion using the screw extruder (28) comprises supplying short fibres of bagasse through a hooper (30) to a barrel (29) having a screw (31) along its longitudinal axis and extruding it at rotational speed of 20-30 RPM with 10 L/D ratio into plank. The extruded bagasse plank was transferred from the screw extruder (28) to a preforming die "B" (27).

The extruded bagasse plank and two squeezed felts/fabrics impregnated with resin system were passed at speed of 4 meter per hour through the said preforming die "B" (27), having dimension of 20 mm thick of I beam of flange with width 70 mm and height of 120 mm, under heating at temperature 80° C. using heating means (33), said two squeezed felts and fabrics were positioned above and below the extruded bagasse plank so as to encapsulate the bagasse plank between the synthetic polyester felts impregnated with the resin system which was further encapsulated by bi-directionally oriented E-glass fabric impregnated with the resin system and obtain precured "I" profiled preform of encapsulated bio-composite product.

The precured "I" profiled preform was finally passed at speed of 4 meter per hour through pultrusion die (34) under heating at temperature 170° C. using heating means (35) so as to obtain cured "I" profiled bio-composite pultruded product and expel it as it was activable under heating. The cured pultruded bio-composite product was pulled out by external pultrusion puller (36).

Example 20

AB Biocomposite Product "I" Profiled

"I" profiled flat pultruded product having dimension of 20 mm thick of I beam of flange with width 70 mm and height of 120 mm was made with 10% of bidirectional glass fabric, 25% of bagasse, 15% of synthetic polyester felt, and 50% of resin system, all measured by volume by following same method as described in Example 19 except replacing unidirectional glass fabric with bidirectional glass fabric.

Example 21

AC Biocomposite Product "I" Profiled

"I" profiled flat pultruded product having dimension of 20 mm thick of I beam of flange with width 70 mm and height of 120 mm was made with 10% of Basalt fabric, 15% of bagasse, 25% synthetic polyester felts, and 50% of resin system, all measured by volume by following same method as described in Example 19 except replacing unidirectional glass fabric with Basalt fabric.

Example 22

AD Biocomposite Product "I" Profiled

"I" profiled flat pultruded product having dimension of 20 mm thick of I beam of flange with width 70 mm and height of 120 mm was made with 10% of polyester fabric, 20% of bagasse, 14% of synthetic polyester felts, and 56% of resin system, all measured by volume by following same method as described in Example 19 except replacing unidirectional glass fabric with polyester fabric.

Example 23

AE Biocomposite Product "I" Profiled

"I" profiled flat pultruded product having dimension of 20 mm thick of I beam of flange with width 70 mm and height of 120 mm was made with 10% of aramid fabric, 25% of bagasse, 15% of synthetic polyester, and 50% resin system, all measured by volume by following same method as described in Example 19 except replacing unidirectional glass fabric with Aramid fabric.

Example 24

AF Biocomposite Product "I" Profiled

"I" profiled flat pultruded product having dimension of 20 mm thick of I beam of flange with width 70 mm and height of 120 mm was made with 10% of Carbon fabric, 10% of bagasse, 35% of synthetic polyester, and 45% of resin system, all measured by volume by following same method as described in Example 19 except replacing unidirectional glass fabric with Carbon fabric. "I" profiled biocomposite products prepared according to examples 19 to 24 were analyzed for its density, modulus of elasticity, modulus of rupture and impact strength and the results of the same are tabulated in Table 4.

TABLE 4

| Fabrics Type | Volume % | | | | Density kg/m³ | Modulus of Elasticity GPa | Modulus of Rupture MPa | Impact Strength |
| --- | --- | --- | --- | --- | --- | --- | --- | --- |
| | Bagasse | Synthetic polyester felts | Polyester Resin | Bio-composite product | | | | |
| Unidirectional Glass fabric 10% V/V | 30 | 14 | 46 | AA | 1,700 | 20.0 | 500 | 60 |
| Bidirectional glass fabric 10% V/V | 25 | 15 | 50 | AB | 1,580 | 20.0 | 608 | 76 |
| Basalt 10% V/V | 15 | 25 | 50 | AC | 1,480 | 22.5 | 669 | 76 |
| Polyester 10% V/V | 20 | 14 | 56 | AD | 1,700 | 10.4 | 371 | 50 |
| Aramid 10% V/V | 25 | 15 | 50 | AE | 1,410 | 20.8 | 328 | 57 |
| Carbon 10% V/V | 10 | 35 | 45 | AF | 1,310 | 30.5 | 652 | 76.7 |

These bio-composite pultruded products obtained according to examples 19 to 24 leads to significant reduction in weight as well as in density because of incorporation of bagasse as a core. This also leads to a significant cost reduction. The glass fabric was distributed at top and bottom over synthetic polyester felts which is covering preformed bagasse at the center part of the product. The present bio-composite products are encapsulated by fabrics in the peripheral area bringing more integrity uniformity of synthetic polyester felts materials further increasing stiffness and tensile strength.

The products of examples 15 and 24 were tested for their allow BM, allow SF, E, EI and tensile strength and the results of the same were tabulated in the table 4. The same test were carried out on 12 mm thick conventional Plywood and H-16 Convention H Beam and the results of the same were tabulated in the table 5.

TABLE 5

| Sr. No. | Property | Unit | Plywood | | H Beam | |
|---|---|---|---|---|---|---|
| | | | 12 mm Thick | 8 mm thick of | | |
| | | | Conventional Plywood | plywood product of example 15 | Conventional H-16 | Product of example 24 |
| 1. | Allow BM | kNm | 0.20 | 0.21 | 3.0 | 3.48 |
| 2. | Allow SF | kN | 6.16 | 17.92 | 6.0 | 63.33 |
| 3. | E | N/mm$^2$ | 6700/3600 | 9424/19424 | 14000 | 19424 |
| 4. | EI | kN-m$^2$ | 1.1 | 1.402 | 145 | 151.00 |
| 5. | Tensile Strength | N/mm$^2$ | 32.5/22.5 | 75.3/28.4 | — | — |

According to the comparative results of products of examples 15 and 24 and conventional products as described in Table 5, the products of the invention have superior performance over the conventional one.

It has been found that the composite products of the present invention is hybrid products with substantial technical advancements. The current invention has following advantages:
1. Low cost;
2. Easy processing system;
3. High toughening strength i.e. High Impact strength;
4. High Isotropic strength than conventional natural fibre composites;
5. Less fatigue (i.e. more durable);
6. Good tensile strength;
7. Comparable strength as that of glass fibre composites; and
8. Utilizes 40% waste materials and hence eco-friendly.

The results illustrated in all five tables unequivocally establish the superior traits of composite products prepared in accordance with the present invention as compared to conventional composite product. The products of the invention with technical advancement are used as shuttering Plywood and I and Plate beam for civil application.

The invention claimed is:

1. A continuous pultrusion method for production of composite pultruded products, the process comprising:
    reducing moisture of synthetic polyester felts and fabric by passing synthetic polyester felts and synthetic fabric selected from polyester, carbon, aramid, glass, basalt, and mixtures thereof through an IR heater at a speed of 2 to 6 meters per hour;
    impregnating the felts and fabrics by passing them at a speed of 2 to 6 meters per hour through a resin bath including a resin system followed by passing them at a speed of 2 to 6 meters per hour through a preforming die under heating at a temperature of 70 to 90° C. to obtain a precured preform of squeezed resin system impregnated felts and fabrics;
    transferring the precured preform of squeezed resin system impregnated felts and fabrics from the preforming die to a pultrusion die by passing the preform at a speed of 2 to 6 meters per hour through the pultrusion die under heating at a temperature of 160 to 180° C. to obtain a cured pultruded composite product; and
    pulling out the cured pultruded composite product from the pultrusion die with an external pultrusion puller, wherein the pultruded composite product consists essentially of 10 to 50% by volume the synthetic polyester felts as a core impregnated with 40 to 60% by volume the resin system encapsulated between 10 to 30% by volume bi-directionally and/or uni-directionally oriented synthetic fabric impregnated with the resin system, and wherein the composite product is either I profiled or Plate profiled.

2. The method as claimed in claim 1 wherein, the synthetic polyester felts are needle punched mat of polyester felts having a weight of 400 to 1000 GSM.

3. The method as claimed in any claim 1 wherein, the resin system includes a resin and a curing system including a curing agent and at least one of an accelerator, filler, thinner, and pigment.

4. The method as claimed in claim 3, wherein the resin used in the resin system is one of,
    a thermosetting resin selected from unsaturated polyester, epoxy, polyurethane, phenolic resins, and mixtures thereof,
    a thermoplastic resin selected from polyethylene, polypropylene, acrylonitrile-butadiene-styrene, polyacetal, polyamide, polyimide, saturated polyester resins, and mixtures thereof, or
    a mixture thereof.

5. A continuous pultrusion method for production of a composite pultruded product, the process comprising;
    reducing moisture from synthetic polyester felts and fabric by providing synthetic polyester felts and synthetic fabric selected from polyester, carbon, aramid, glass, basalt, and mixtures thereof and passing them through an IR heater at a speed of 2 to 6 meters per hour;
    impregnating the felts and fabrics by passing them at a speed of 2 to 6 meters per hour through a resin bath including a resin system followed by passing the impregnated felts and fabrics at a speed of 2 to 6 meters per hour through a preforming die A using a pressurizing means to obtain squeezed felts and fabrics impregnated with the resin system;

transferring the squeezed felts and fabrics impregnated with resin system to a preforming die B;

preparing a plank from fibers of bagasse premixed with the resin system using a screw extruder by supplying fibers of bagasse premixed with the resin system through a hopper to a barrel having a screw along its longitudinal axis for extruding the fibers and the resin system into the plank at a rotational speed of 20-30 RPM with 10 L/D ratio;

transferring the extruded plank from the screw extruder to the preforming die B;

encapsulating the plank between the synthetic polyester felts impregnated with the resin system which is further encapsulated by bi-directionally and/or uni-directionally oriented synthetic fabric selected from polyester, carbon, aramid, glass, basalt, and mixtures thereof impregnated with the resin system by passing the squeezed felts/fabrics impregnated with resin and the plank at a speed of 2 to 6 meters per hour through the preforming die B under heating at a temperature of 70 to 90° C. to obtain a precured preform of encapsulated composite product; and preparing a cured preform of bio-composite product by passing the precured preform of composite product at a speed of 2 to 6 meters per hour through a pultrusion die under heating at a temperature of 160 to 180° C. to obtain a cured composite pultruded product and pulling out the pultruded composite product by an external pultrusion puller, wherein the pultruded composite product consists essentially of 10 to 30% by volume plank of bagasse fibers premixed with 40 to 60% by volume the resin system as a core encapsulated between 10 to 40% by volume the synthetic polyester felts impregnated with the resin system which is further encapsulated between 5 to 10% by volume bi-directionally and/or uni-directionally oriented synthetic fabric selected from polyester, carbon, aramid, glass, basalt, and mixtures thereof impregnated with the resin system, and wherein the composite product is either I profiled or Plate profiled.

6. The method as claimed in claim 5 wherein, the synthetic polyester felts are needle punched mat of polyester felts having a weight of 400 to 1000 GSM.

7. The method as claimed in claim 5 wherein, the bagasse fibers are premixed with the resin system prior to extrusion, and wherein the bagasse fibers and resin system have equal volume.

8. The method as claimed in claim 5 wherein, the resin system includes a resin and a curing system including a curing agent and at least one of an accelerator, filler, thinner, and pigment.

9. The method as claimed in claim 8 wherein, the resin used is one of,
- a thermosetting resin selected from unsaturated polyester, epoxy, polyurethane, phenolic resins, and mixtures thereof,
- a thermoplastic resin selected from polyethylene, polypropylene, acrylonitrile-butadiene-styrene, polyacetal, polyamide, polyimide, saturated polyester resins, and mixtures thereof, or
- a mixture thereof.

* * * * *